(12) United States Patent
Horiyama et al.

(10) Patent No.: US 6,502,949 B1
(45) Date of Patent: Jan. 7, 2003

(54) ADAPTERS FOR USE WITH AN ELECTRIC POWER TOOL

(75) Inventors: Toru Horiyama, Anjo (JP); Norifumi Niwa, Anjo (JP); Kazuyuki Sakakibara, Okazaki (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/924,219

(22) Filed: Aug. 7, 2001

(51) Int. Cl.[7] ............................................. B25B 23/18
(52) U.S. Cl. ................ 362/119; 362/109; 362/190; 362/191; 362/198; 173/217; 320/114
(58) Field of Search .................. 362/119, 120, 362/109, 208, 190, 191, 198, 253; 173/217, 29; 310/47, 50; 320/114, 115

(56) References Cited

U.S. PATENT DOCUMENTS

| | | | |
|---|---|---|---|
| 2,310,166 A | * 2/1943 | Way .......................... | 362/119 |
| 2,525,588 A | 10/1950 | Cameron et al. ............... | 240/2 |
| 3,213,303 A | * 10/1965 | Riley, Jr. et al. .............. | 310/50 |
| 3,757,194 A | * 9/1973 | Weber et al. ................ | 320/112 |
| 3,883,789 A | * 5/1975 | Achenbach et al. ............ | 429/9 |
| 4,084,123 A | * 4/1978 | Lineback et al. ............ | 320/111 |
| 4,751,452 A | * 6/1988 | Kilmer et al. ............... | 320/106 |
| 5,068,683 A | 11/1991 | Miyazaki .................... | 354/484 |
| 5,076,805 A | * 12/1991 | Welch ........................ | 439/568 |
| 5,169,225 A | 12/1992 | Palm .......................... | 362/118 |
| 5,281,990 A | 1/1994 | Huang ......................... | 354/484 |
| 6,168,287 B1 | * 1/2001 | Liu ............................. | 362/119 |

FOREIGN PATENT DOCUMENTS

| | | |
|---|---|---|
| DE | 3516099 | 11/1986 |
| FR | 2523891 | 9/1983 |
| JP | 2512328 | 7/1996 |
| JP | 10-44064 | 2/1998 |

OTHER PUBLICATIONS

U.S. Patent Application Publication 2001/0035736 A1, Person, Nov. 1, 2001, Tool Storage Apparatus.*

* cited by examiner

*Primary Examiner*—Alan Cariaso
*Assistant Examiner*—Sharon Payne
(74) *Attorney, Agent, or Firm*—Lahive & Cockfield, LLP

(57) ABSTRACT

An adapter (1) for an electric power tool (45) includes a main body (2) that has a light assembly and a first coupling portion (4) provided on the top surface of the main body (2), the first coupling portion (4) having a configuration identical to a coupling portion of a battery pack (31) that is attached to the electric power tool (45). The adapter further includes a second coupling portion (5) provided on the bottom surface of the main body (2), the second coupling portion (5) having a configuration identical to a coupling portion of the electric power tool (45) that is attached to the battery pack (31). The light assembly includes a light (26) attached to the main body (2) via a flexible stem (27). The light (26) can be turned on and off independently from the operation of the electric power tool (45).

18 Claims, 14 Drawing Sheets

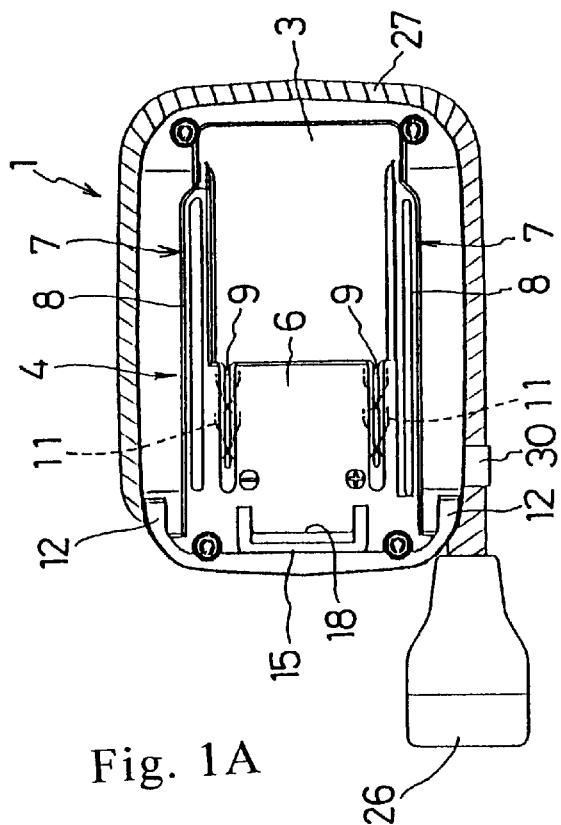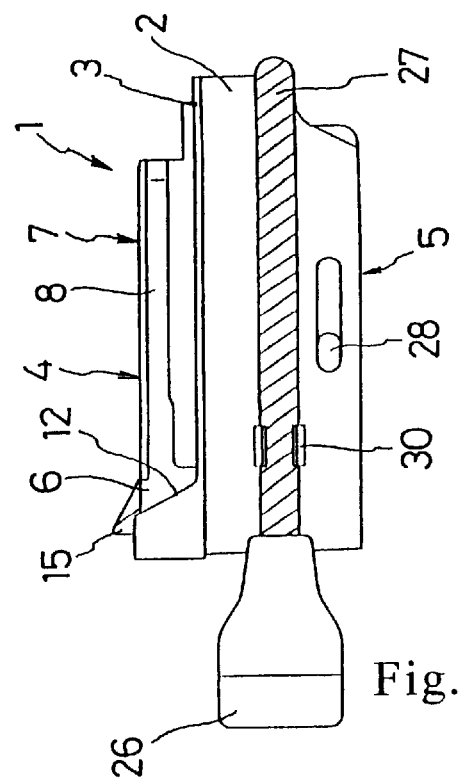
Fig. 1A
Fig. 1B
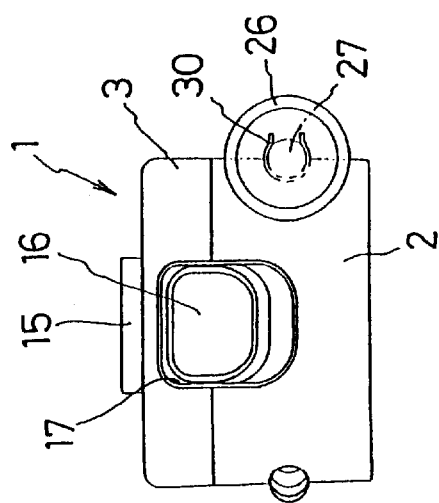
Fig. 1C

Fig. 6A
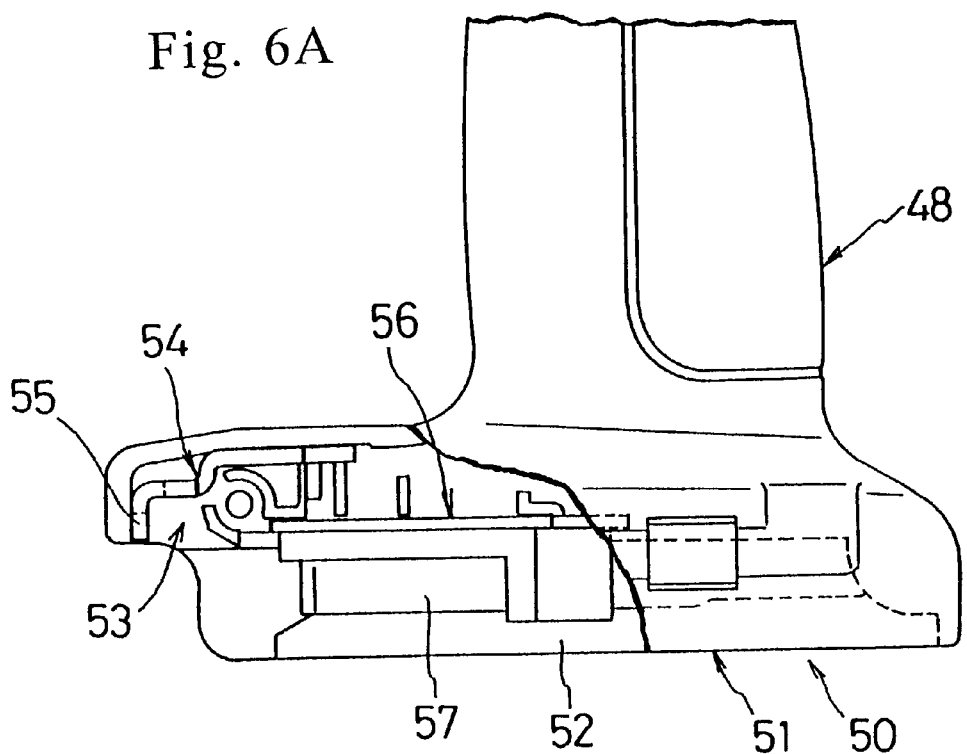
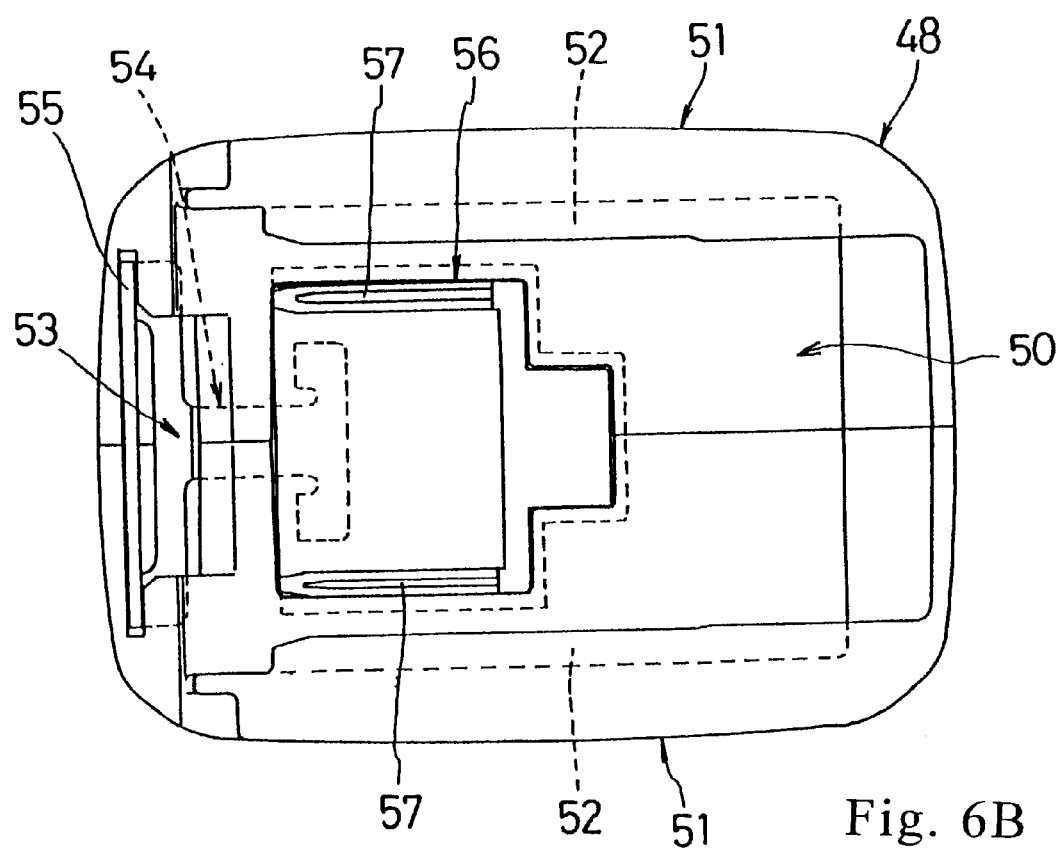
Fig. 6B

ADAPTERS FOR USE WITH AN ELECTRIC POWER TOOL

BACKGROUND OF THE INVENTION

1. Field of the Invention

The present invention relates to adapters for use with electric power tools that are powered by battery packs attached thereto.

2. Description of the Related Art

One known device optionally attachable to an electric power tool is a light mounted thereon that can be turned on to illuminate the tip of the tool bit or where the work is being performed. One of the problems of this arrangement is the extra weight that the lighting device adds to the power tool. Another problem is that the light tends to constitute an obstruction to the user at times when no lighting is needed. Japan Published Unexamined Patent Application No. 10-44064 discloses an invention that attempts to address these problems. According to this invention, a lighting unit is removably attached to a battery pack such that the unit can be removed by the user when there is sufficient light where work is done or otherwise when no such illumination is required.

While the foregoing arrangement achieves its intended objective, it suffers from a number of deficiencies that reduce its utility. For example, as the location where the lighting unit is attached to the battery pack differs from that where the battery pack is attached to an electric power tool, the pack needs to be provided with a separate structure for mounting the lighting unit. Not only does such an additional structure increase the overall cost of the battery pack, but it also creates the risk of shorting in the battery pack circuitry, since the terminals at the location where the additional structure is attached are exposed when the lighting unit is not attached to the battery pack. Furthermore, the exposed circuitry may also be damaged during the operation of the battery unit or even during storage when the lighting unit is not attached thereto.

SUMMARY OF THE INVENTION

In view of the above-identified problems, an important object of the present invention is to provide an adapter for use with an electric power tool that easily provides the tool with additional functionality, including but not limited to lighting or dust collection, without creating the risk of a short circuit when the adapter is not attached or without increasing the manufacturing cost.

Another important object of the present invention is to provide an adapter for use with an electric power tool that easily provides the tool with non-electrical functionality, such as a tool hooking function that allows the user to hang the tool on one's person or a structure.

To achieve these objectives, the present invention provides an adapter for an electric power tool on which a battery pack is mounted to supply power thereto. The adapter comprises a main body that includes top and bottom surfaces and that has an additional device for use with the electric power tool and a first coupling portion which is provided on the top surface of the main body and which has a configuration identical to a coupling portion of the battery pack that is to be attached to the electric power tool. The adapter additionally comprises a second coupling portion which is provided on the bottom surface of the main body and which has a configuration identical to a coupling portion of the electric power tool that is attached to the battery pack.

According to this arrangement, no change in the designs of either the battery pack or the electric power tool is necessary, and thus no additional cost is required. Moreover, as no terminals are exposed when the adapter is attached, short circuits between the terminals are prevented and the terminals are protected from any damage.

According to one aspect of the present invention, the additional device comprises a light that operates by receiving power from the battery pack. According to this arrangement, a lighting function can be easily and readily added to the electric power tool.

According to another aspect of the present invention, the additional device comprises a light that can be oriented to a desired direction.

According to still another aspect of the present invention, the additional device comprises a light that operates by receiving power from the battery pack and that can be oriented to a desired direction.

According to yet another aspect of the present invention, the additional device further comprises a flexible stem having a free end coupled to the light and a fixed end coupled to the main body of the adapter, such that the position of the light can be manually adjusted.

According to one feature of the present invention, the main body includes: two pairs of opposing side surfaces connecting the top surface and the bottom surface; a groove formed in three of the side surfaces for at least partially accommodating the flexible stem therealong; and holder means for securing the flexible stem close to the free end of the flexible stem when the stem is accommodated in the groove.

According to another feature of the present invention, the groove has a first end at the fixed end of the flexible stem and a second end adjacent to a point at which the free end of the flexible stem is located when the stem is accommodated in the groove.

According to still another feature of the present invention, the adapter further comprises circuitry for placing the light in parallel with the electric power tool so as to permit the light to be turned on and off independently from the tool when the adapter is connected to the electric power tool and the battery pack.

According to yet another feature of the present invention, the adapter further comprises circuitry that gangs together the light and the electric power tool so as to synchronize the operation of the light to that of the tool when the adapter is connected to the electric power tool and the battery pack.

According to one practice of the present invention, the additional device comprises a motor that has an output shaft and operates by receiving power from the battery pack and a fan fixed on the output shaft of the motor; a dust chamber that is defined within the main body and accommodates the fan, with the dust chamber having an intake side and an exhaust side. The device further comprises a suction nozzle connected to the intake side of the dust chamber and an outlet pipe connected to the exhaust side of the dust chamber. This arrangement permits easily addition of a cleaner function to the electric power tool.

According to another practice of the present invention, the suction nozzle and the outlet pipe are disposed on opposing sides of the dust chamber, thus interposing the dust chamber therebetween.

According to still another practice of the present invention, the suction nozzle is connected to the dust chamber via a flexible stem.

According to yet another practice of the present invention, the adapter further includes circuitry for placing the motor in parallel with the electric power tool so as to permit the motor to be turned on and off independently from the tool when the adapter is connected to the tool and the battery pack.

In accordance with another aspect of the present invention, the adapter further includes circuitry that gangs together the motor and the electric power tool so as to synchronize the operation of the motor to that of the tool when the adapter is connected to the tool and the battery pack.

In one embodiment, the additional device comprises a hook secured to the main body for hanging the adapter. This arrangement readily renders the electric power tool portable on one's person; alternatively, it permits the tool to be hung on a structure, such as a peg on the wall.

In one practice, the additional device comprises a hook secured to the main body for hanging the adapter.

To carry out the invention in one preferred mode, the first coupling portion is complementarily shaped to the second coupling portion. Furthermore, the electric power tool may include a second coupling portion at its bottom surface and the battery pack may include a first coupling portion at its top surface, thus allowing attachment of the adapter to the tool and attachment of the battery pack to the adapter.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which:

FIGS. 1A, 1B, and 1C are a plan view, a side elevation view, and a front elevation view, respectively, of an adapter having a lighting function in accordance with the present invention;

FIG. 6A is a partially cutaway side view showing a driver/drill grip handle to which the light adapter of FIG. 1 is attached;

FIG. 6B is a bottom plan view of the driver/drill's handle shown in FIG. 7A;

Figure 14A:
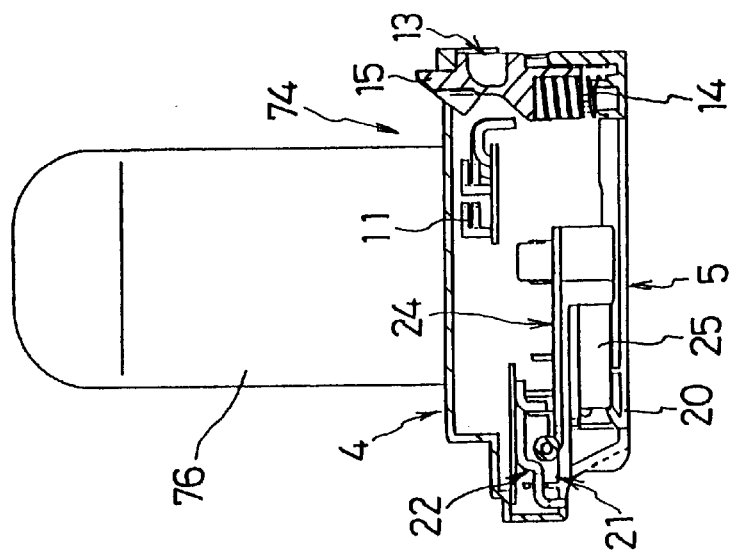
Figure 14B:
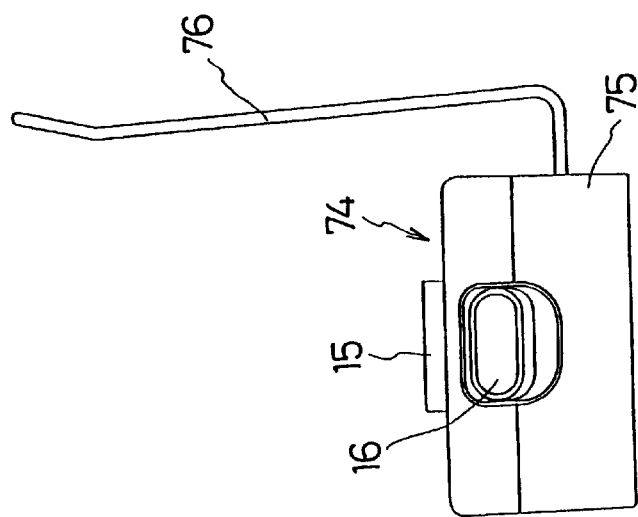
Figure 14C:
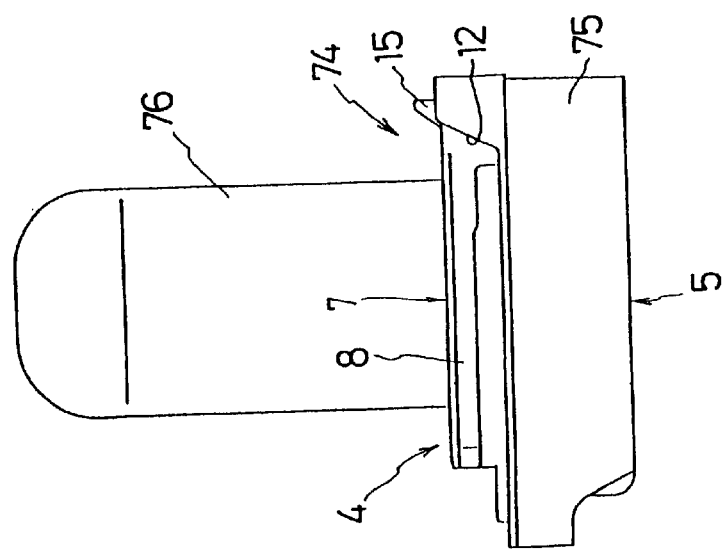
Figure 15:
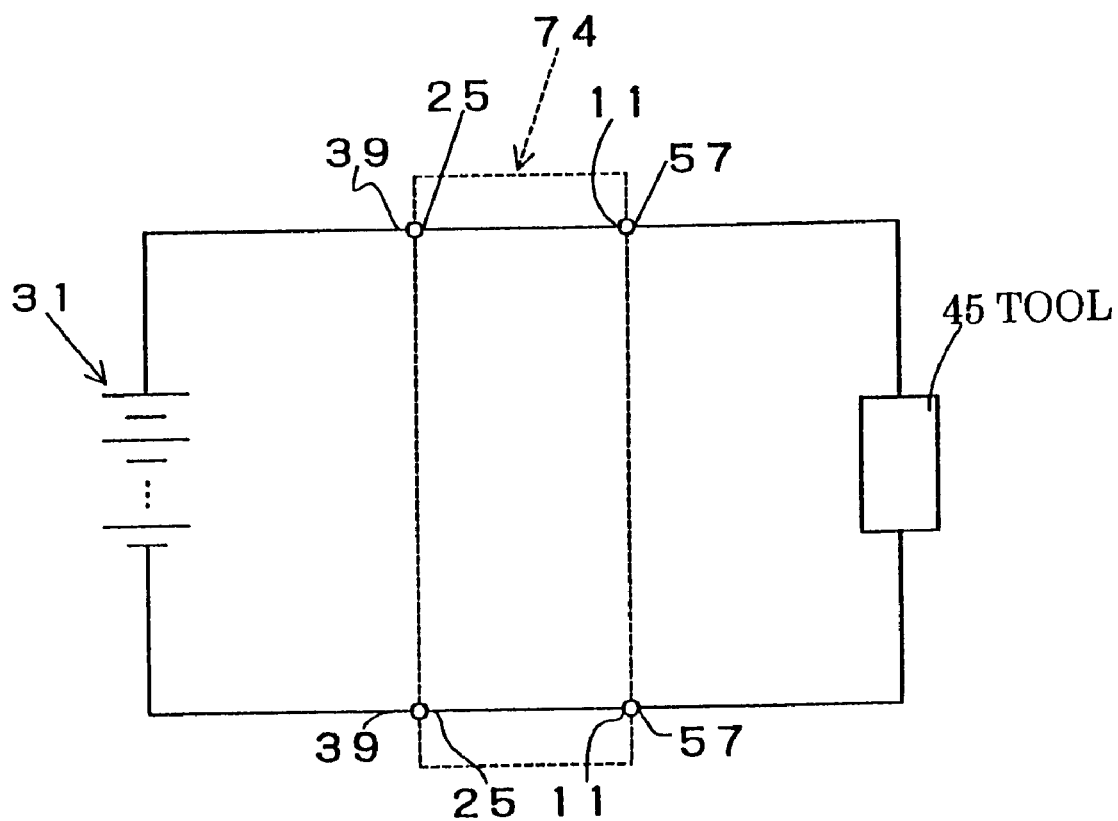

FIGS. 14A, 14B, and 14C are a cross-sectional view, a front elevation view, and a side elevation view, respectively, of an adapter having a hook function of a third embodiment;

FIG. 15 is a circuit diagram of the hook adapter of FIG. 14; and

Figure 5:
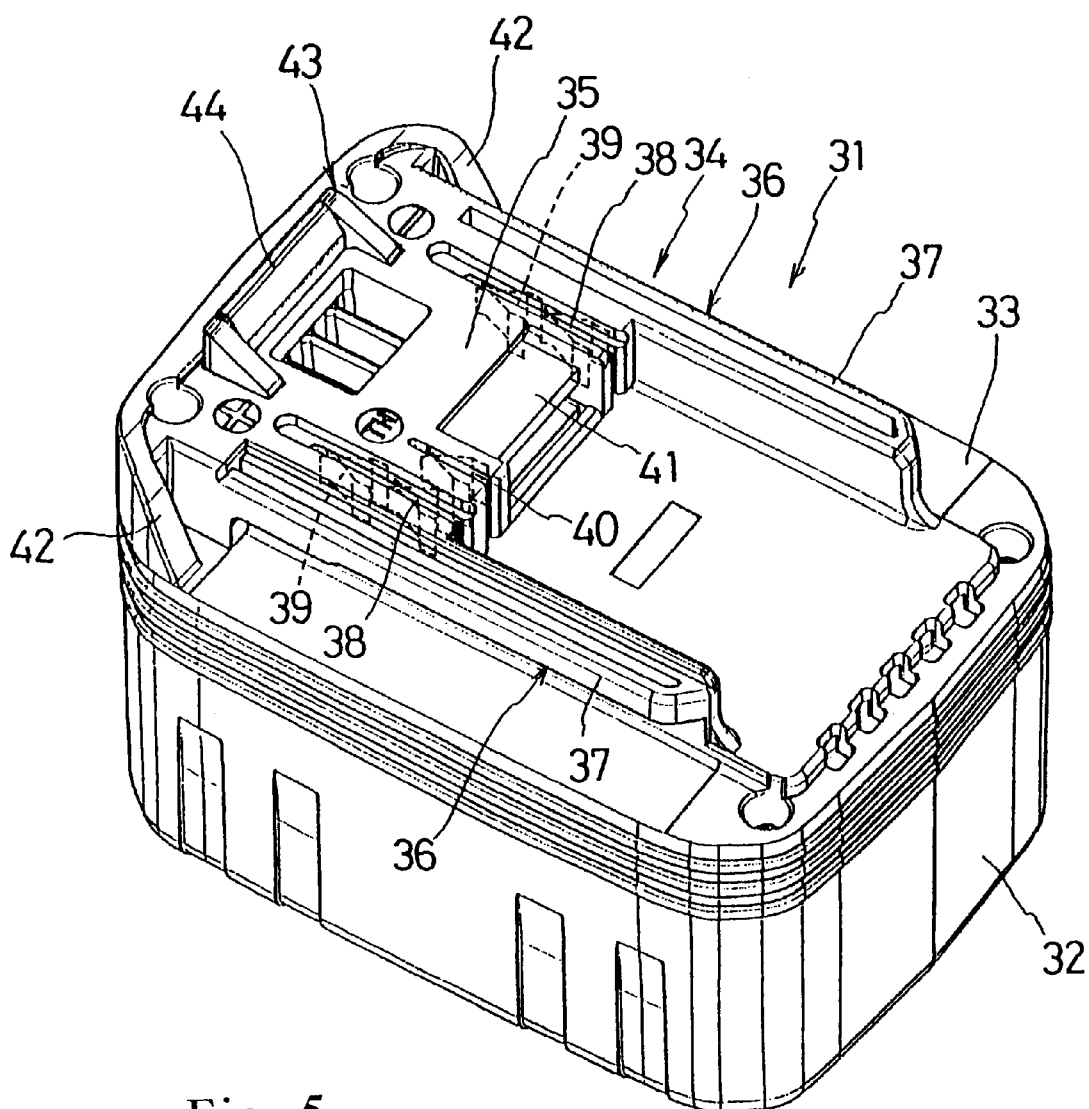
FIG. 5 is a perspective view of a battery pack used in combination with the light adapter shown in FIG. 1.
Figure 16:
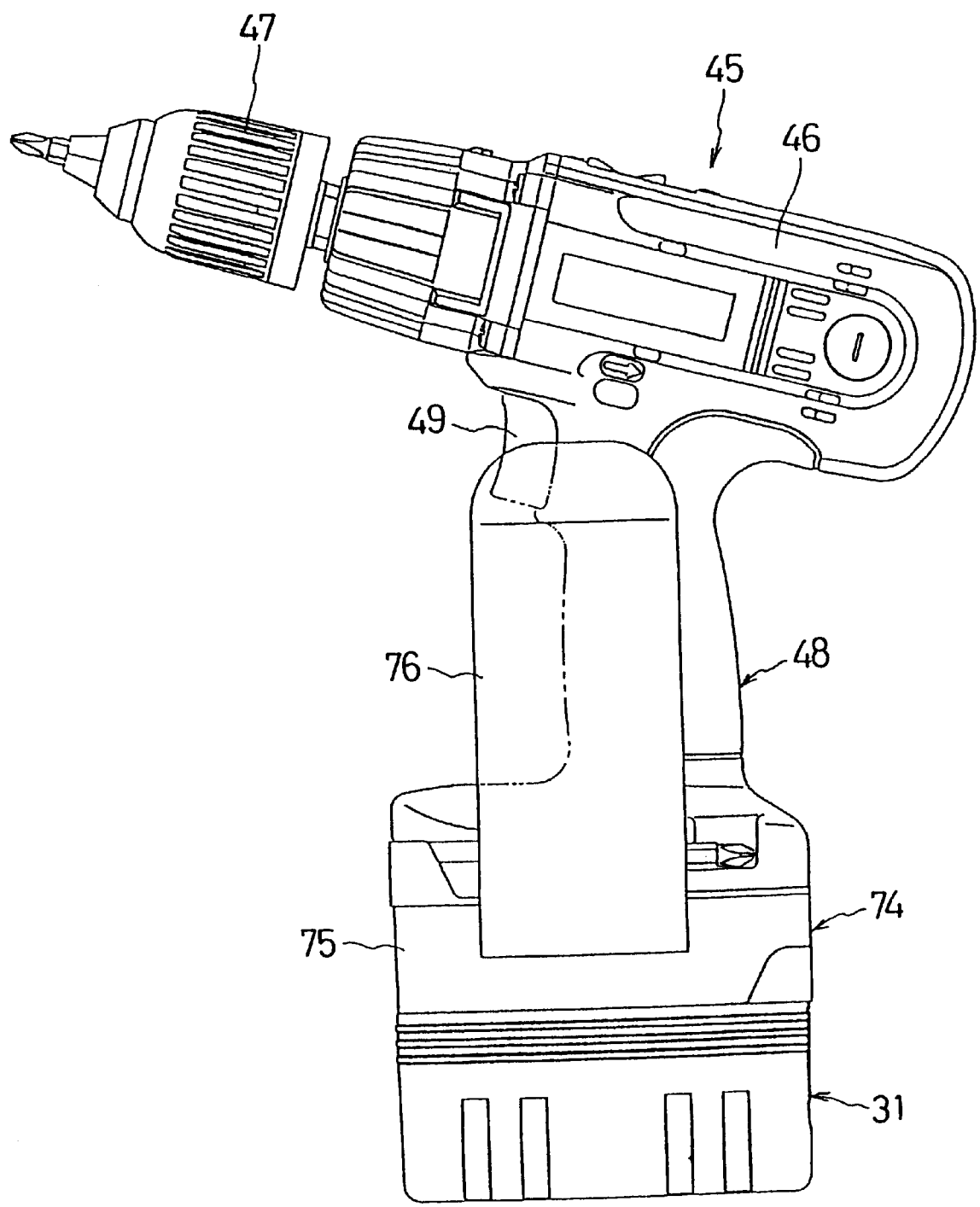

FIG. 16 shows the battery pack of FIG. 5 attached to the driver/drill of FIG. 6 via the hook adapter of FIG. 14.

DETAILED DESCRIPTION OF THE PREFERRED EMBODIMENT

Preferred embodiments according to the present invention will be described hereinafter with reference to the attached drawings.

Embodiment 1

Figure 2A:
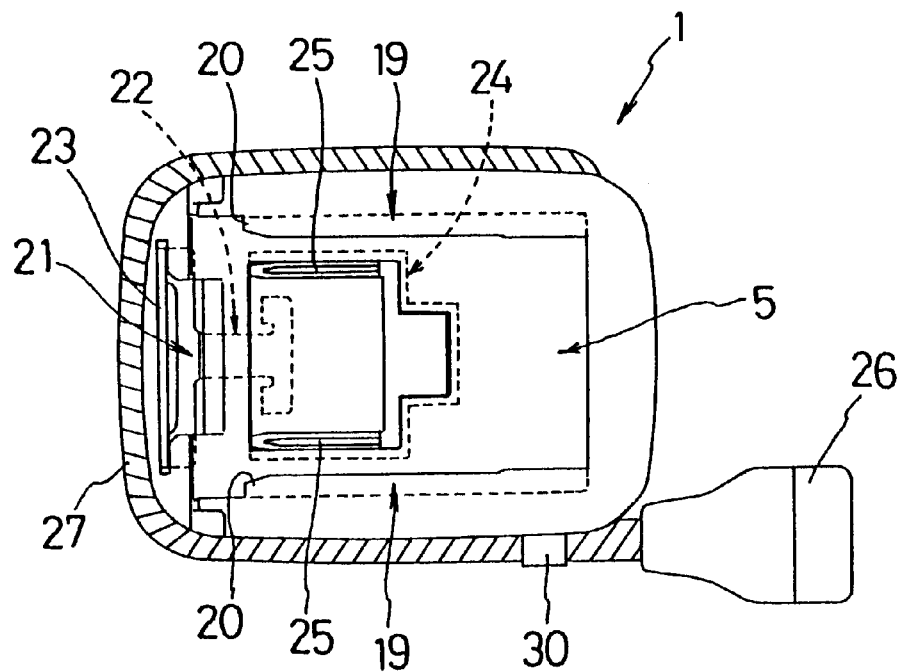
FIGS. 2A and 2B are a bottom view and a cross-sectional view, respectively, of the light adapter shown in FIG. 1.
Figure 2B:
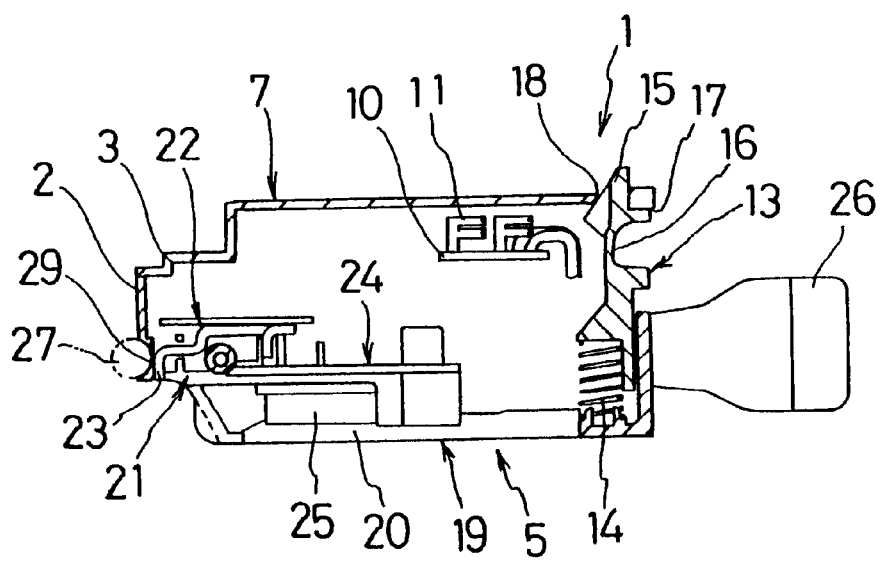

FIGS. 1A, 1B, and 1C are a plan view, a side elevation view, and a front elevation view, respectively, of an adapter 1 having a lighting function according to the present invention. FIGS. 2A and 2B are a bottom view and a cross-sectional view, respectively, of the light adapter 1. As shown in the foregoing figures, the light adapter 1 includes a generally box-shaped main body 2 having a lid 3 assembled to the top thereof. Provided on the top surface of the lid 3 is a first coupling portion 4 for removably attaching the light adapter 1 to an electric power tool, such as a driver/drill 45 (see FIGS. 7 and 8) described in detail below. A battery pack 31 (see FIGS. 5 and 7; to be described in further detail below), which supplies power to the power tool 45 and the light adapter 1, is provided with a coupling portion identical with the first coupling portion 4 of the adapter 1 as described in detail below. The main body 2 is further provided at its bottom surface with a second coupling portion 5 for removably attaching the battery pack 31 to the light adapter 1. The driver/drill 45 has a coupling portion identical with the second coupling portion 5 of the light adapter 1 as described in detail below. The first coupling portion 4 includes a top end 6 and a pair of slide rails 7 extending in parallel in a forward direction from the top end 6 (in the direction opposite the top end 6 from the center of the adapter's top surface). The parallel slide rails 7 are spaced apart by a selected distance. Each slide rail 7 includes an outwardly extending flange 8 along the entire length of the rail 7, thus forming an inverted L-shaped cross section on a plane which extends orthogonal to the aforementioned forward direction. Provided at the top end 6 between and parallel to the pair of parallel slide rails 7 are slits 9 which expose positive and negative terminals 11 set on a substrate 10 contained in the lid 3. The light adapter 1 additionally includes stoppers 12 at the farthest rear side of the top end 6 designed to come into abutment with the front ends of the guide rails of an electric power tool 45 when the adapter 1 is attached to the tool 45.

Additionally provided at the rear end of the light adapter 1 are a coil spring 14 set in the bottom surface of the main body 2 and a vertically movable hook 13 upwardly biased by the coil spring 14. As best shown in FIG. 2B, the hook 13 includes at its upper end a prong 15 which has a generally U-shaped cross-section and a front surface sloping down in the forward direction from its top. In addition, as clearly shown in FIGS. 1C and 2B, the hook 13 includes at its rear surface a manual slide 16 that protrudes from a cut-out 17 formed between the main body 2 and the lid 3. The top end of the manual slide 16 is brought into abutment with the upper edge of the cut-out 17 by the biasing force of the coil spring 14, thus limiting the upper position of the hook 13. Additionally, the slide 16 has a recess in the center outside surface. As shown in FIGS. 1B, 1C, and 2C, at the upper limit position, the hook 13 protrudes from a generally U-shaped through-hole 18 made in the lid 3.

Referring mainly to FIGS. 2A and 2B, the second coupling portion 5 includes two guide rails 19 which extend in the forward direction and which are spaced apart from each other by a distance slightly greater than the distance between the outside edges of the flanges 8 of the slide rails 7. Furthermore, a flange 20 is formed on the underside of each guide rail 19, with the flanges 20 extending inwardly generally along nearly the entire length of the respective guide rails 19.

Still referring to FIGS. 2A and 2B, a recess 21 is formed at the front center portion of the second coupling portion 5. A reinforcing strip 23 of a support plate 22 assembled to the second coupling portion 5 abuts the front wall of the recess 21.

Moreover, the light adapter 1 further includes a terminal block 24 disposed at the rear of the recess 21. The terminal block 24 in turn includes positive and negative terminal strips 25 along the side edges of the bottom surface of terminal block 24. The positive and negative terminal strips 25 are disposed parallel to the guide rails 19 and are spaced apart by the same distance as that between the terminals 11. In addition, the terminal strips 25 are connected to the terminals 11 of the first coupling portion 4 via lead wires.

The light adapter 1 additionally includes a flexible stem or gooseneck 27 with a light 26 attached to the top free end thereof. The other fixed end of the flexible stem 27 is coupled at the rear left side of the main body 2. A change-over switch 28 for the light 26 is disposed on the right side surface of the main body 2. The flexible stem 27 is capable of being straightened and bent to various shapes to hold and orient the light 26 at any desired angle relative to the main body 2. As illustrated in the aforementioned figures, when not in use, the stem 27 can be wrapped around the main body 2 by disposing it along a groove 29 formed in the outer side surfaces of the main body 2. Additionally, a generally C-shaped grip ring 30 is provided in the groove 29 close to the groove's right end so as to secure the flexible stem 27 close to the light 26.

Figure 3:
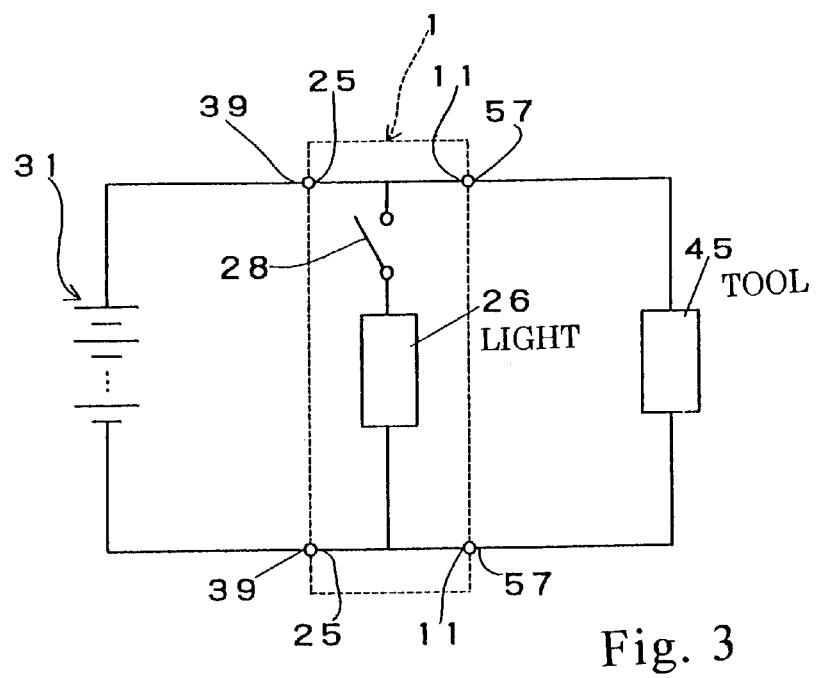
FIG. 3 is a circuit diagram of the light adapter shown in FIG. 1.

As shown in FIG. 3, the electric wiring within the light adapter 1 is such that when attached to the battery pack 31 and the driver/drill 45 ("TOOL" in FIGS. 3–4, 12–13, and 15), the light 26 is placed in parallel with the driver/drill in the circuit, permitting the light 26 to be independently switched on and off by the operation of the change-over switch 28.

FIG. 5 is a perspective view of the battery pack 31 used in combination with the light adapter 1. The battery pack 31 includes an upper case 33 and a lower case 32 which contains a plurality of storage cells (not shown). A coupling portion 34 which is identical with the first coupling portion 4 of the light adapter 1 is provided on the upper case 33. More specifically, the coupling portion 34 includes a top end 35 and a pair of slide rails 36 extending in parallel in a forward direction from the top end 35 (in the direction opposite the top end 35 from the center of the pack's top surface). Each of the slide rails 36 includes an outwardly extending flange 37 along the entire length of the rail 36, thus forming an inverted L-shaped cross section on a plane which extends orthogonal to the aforementioned forward direction. Provided in the top end 35 between and parallel to the pair of parallel slide rails 36 are slits 38 which expose positive and negative charge/discharge terminals 39 set on a substrate contained in the upper case 33. The slits 38 are spaced apart from each other by the same distance as that between the terminal strips 25 of the light adapter 1. The top end 35 includes, in addition to the charge/discharge terminals 39, a temperature detection terminal 40 and a connector-type data transmission terminal 41 which establish connection with the respective terminals of a matching charger (not shown) when the battery pack 31 is set in place on the charger.

As in the light adapter 1, the battery pack 31 additionally includes stoppers 42 at the farthest rear side of the top end 35 for coming into abutment with the rear ends of the guide rails of the light adapter 1 when the pack 31 is attached to the adapter 1. Additionally provided in the battery pack 31 is a hook 43 (similar to the adapter's hook 13) which includes a prong 44 having a sloping front surface. The hook 43 is biased upward by a coil spring (not shown), allowing the prong 44 to protrude from the upper surface of the upper case 33.

Figure 7:
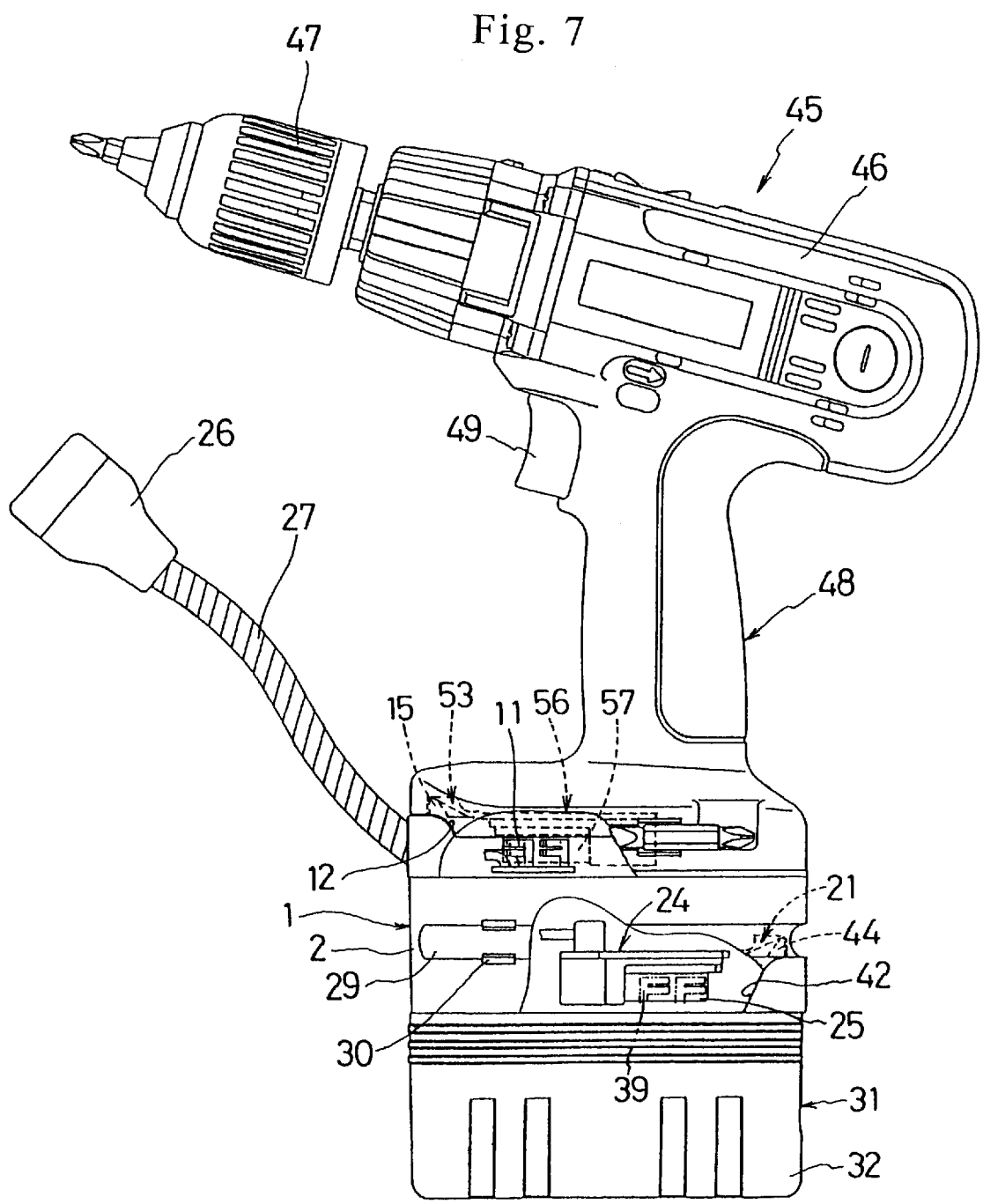
FIG. 7 shows the light adapter of FIG. 1 coupled to the driver/drill of FIG. 6 at its top surface and to the battery pack of FIG. 5 at its bottom surface.

FIG. 6A is a partially cutaway side view showing a grip handle 48 of the driver/drill 45 to which the light adapter 1 can be attached, and FIG. 6B is a bottom plan view of the handle 48 of the driver/drill. FIG. 7 shows the light adapter 1 coupled to the driver/drill 45 at its top surface and to the battery pack 31 at its bottom surface. The driver/drill 45 includes a main housing 46 which encases a motor and a rotation transmission mechanism (neither shown). Additionally included in the tool 45 at its top end is a drill chuck 48 for securely holding a tool bit. The grip handle 48 of the driver/drill 45 extends from the bottom of the main housing 46 at an angle to the longitudinal axis of the main housing 46. The grip handle 48 includes a trigger switch 49 for switching on the power tool 45 and a coupling portion 50 which is constructed identically to the second coupling portion 5 of the light adapter 1.

Referring mainly to FIGS. 6A and 6B, the coupling portion 50 includes two guide rails 51 which extend in the forward direction (to the left in FIGS. 6A and 6B) and which are spaced apart from each other by a distance slightly greater than the distance between the outside edges of the flanges 8 of the slide rails 7 of the light adapter 1. Furthermore, a flange 52 is formed on the underside of each guide rail 51, with the flanges 52 extending inwardly generally along the entire length of the respective guide rails 51. Additionally, a hook holding recess 53 is formed in the front center portion of the coupling portion 50 which can be engaged by the prong 15 of the adapter's hook 13. Still referring to FIGS. 6A and 6B, a reinforcing strip 55 of a support plate 54 disposed in the coupling portion 50 abuts the front wall of the recess 53.

Moreover, reference numeral 56 designates a terminal block disposed at the rear of the recess 53. The terminal block 56 includes positive and negative terminal strips 57 at the side edges of the bottom surface of terminal block 56. The positive and negative terminal strips 67 are disposed parallel to the guide rails 51 and spaced apart by the same distance as that between the terminals 11 of the light adapter 1.

The above-described structure of the light adapter 1 (in which the first coupling portion 4 at the top surface thereof is identical to the coupling portion 34 of the battery pack 31, and the second coupling portion 5 at the bottom surface is identical to the coupling portion 50 of the driver/drill 45) permits attachment of the battery pack 31 to the driver/drill 43 via the light adapter 1. More specifically, when the top ends of the slide rails 36 of the battery pack 31 are fitted between the guide rails 19 of the adapter's second coupling portion 5 and when either pair of rails are slid forward, the flanges 37 of the slide rails 36 are held by the flanges 20 of the guide rails 19. The battery pack 31 is then slid forward relative to the adapter 1 until the stoppers 42 of the pack's upper case 33 come into contact with the front ends of the guide rails 19. Thereupon, the hook 43 of the battery pack 31, which has been pushed inside the pack's upper case 33 by the front end of the adapter 1, pops back to bring the prong 44 into engagement with the recess 21 of the second coupling portion 5 of the light adapter 1 (see FIG. 7). This securely attaches the battery pack 31 to the light adapter 1 by means of the hook 43. Concurrently, the terminal strips 25 of the second coupling portion 5 are inserted in the slits 38 in the top surface of the battery pack 31, thus establishing electrical connection with the charge/discharge terminals 39.

As a next step, with the battery pack 15 attached to the light adapter 1, the slide rails 7 of the adapter's first coupling portion 4 are fitted between the guide rails 51 at the bottom of the grip handle 48 of the driver/drill 45. When either pair of rails is slid forward, the flanges 8 of the slide rails 7 are held by the flanges 52 of the guide rails 51. In a manner similar to the above, the light adapter 1 is further slid forward relative to the driver/drill 45 until the stoppers 12 of the adapter 1 come into abutment with the front ends of the guide rails 51. Thereupon, the hook 13 of the light adapter 1, which has been pushed down, pops back to bring the prong 15 into engagement with the recess 53 of the coupling portion 50 of the driver/drill 45 (see FIG. 7). This securely attaches the light adapter 1 to the tool's grip handle 48 by means of the hook 13. Concurrently, the terminal strips 57 of the coupling portion 50 are inserted in the slits 9 at the top surface of the light adapter 1, thus establishing electrical connection between the terminal strips 57 and the charge/discharge terminals 39 of the battery pack 31 via the terminals 11 and the terminal strips 25 of the light adapter 1.

As the battery pack 31 supplies power to the driver/drill 45 and the light adapter 1, the driver/drill operates when the trigger switch 49 of the tool 45 is pulled in, whereas the light 26 turns on when the change-over switch 28 of the light adapter 1 is operated.

As described above, according to the first embodiment, as the battery pack 31 is connected to the driver/drill 45 via the light adapter 1, a lighting function can be easily and readily added to the driver/drill so as to enhance the operability of the tool 45. In particular, the coupling portion 50 of the driver/drill 45 can be easily connected to the first coupling portion 4 provided at the top surface of the adapter's main body 2, whereas the coupling portion 34 of the battery pack 31 can also be easily connected to the second coupling portion 5 at the bottom surface of the adapter's main body 2. One of the advantages of this arrangement is that no change in the designs of either the battery pack 31 or the driver/drill 45 is necessary, and thus no additional cost is required. Moreover, as no terminals are exposed when the light adapter 1 is attached, short circuits between the terminals are prevented and the terminals are protected from any damage. Furthermore, as the first coupling portion 4 of the light adapter 1 can be set on the charger, the battery pack 31 can be charged on the charger with the adapter 1 still attached to the battery pack.

When not using the light 26 of the light adapter 1, the user can remove the adapter by reversing the foregoing attachment procedure: first, the hook 13 is pushed down by operating the manual slide 16 so as to disengage the prong 15 from the recess 53 at the bottom of the tool's grip handle 48, whereupon the light adapter 1 may be removed from the electric power tool 45. Secondly, in a manner identical to the foregoing, after the hook 43 of the battery pack 31 is pushed down so as to disengage the prong 44 from the adapter's recess 21, the battery pack 31 may be removed from the light adapter 1. Upon completion of this removal procedure, the battery pack 31 can be then attached to the driver/drill 45 to resume operation.

The design and/or construction of the light assembly (the light 26 and the flexible stem 27) is not limited to the foregoing; any suitable alternative may be used in its place without departing from the spirit and scope of the present invention. For example, the light 26 or any other suitable type of a light may be directly mounted on the side surface of the light adapter 1 without using the flexible stem 27. However, the relatively long stem 27 of the embodiment provides a high degree of flexibility when using the light 26 in various working conditions. For example, when used in combination with a circular saw, the light adapter 1 of this embodiment facilitates operation by clearly illuminating the mark-off line or other mark(s) for cutting.

Figure 4:
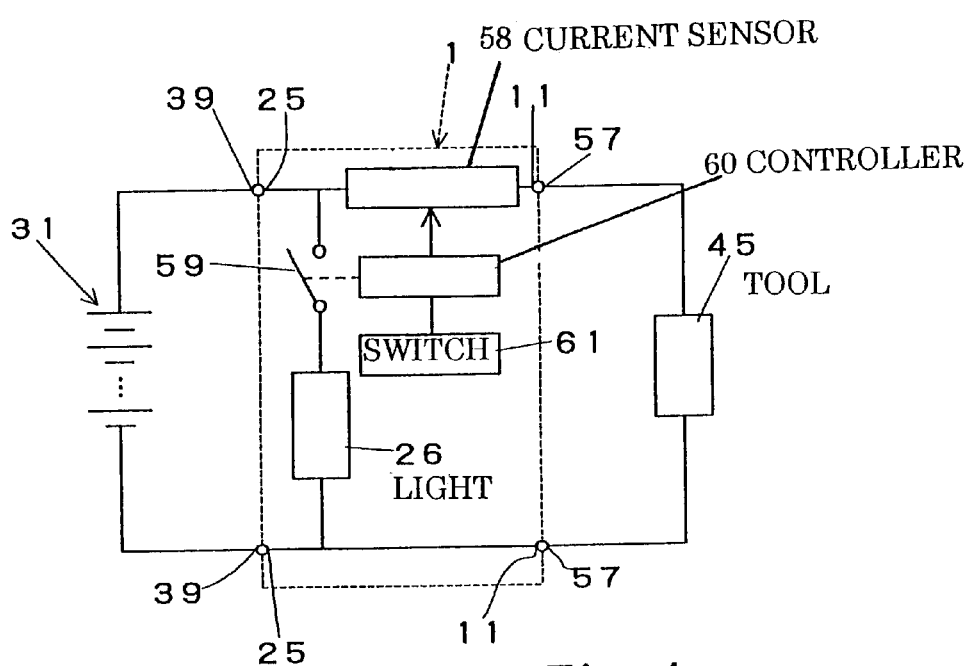
FIG. 4 is a diagram showing an alternate circuit for the light adapter shown in FIG. 1.

In the first embodiment, the adapter light 26 is independently turned on and off with the change-over switch 28. As shown in FIG. 4, however, the light adapter 1 may additionally include in its circuitry a current sensor 58 for detecting power supply to the driver/drill 45, a contact 59 placed in series with the light 26, a controller 60 for making and breaking the contact 59 upon detection of the power supply by the sensor 58, and a switch 61 for turning on the controller 60 such that the light 26 and the driver/drill 45 are ganged together or combined to cause the light 26 automatically come on upon activation of the driver/drill 45. This arrangement not only saves power but also eliminates the need for manually turning on and off the light 26. It should be noted that the circuit may be modified or redesigned to provide a first switch position to independently turn on the light 26, a second switch position to independently turn off the light 26, and a third position to cause the light and the driver/drill 45 to operate synchronously (i.e., to go into ganged control mode in which the light 26 remains on only while the driver/drill 45 is activated).

Figure 8:
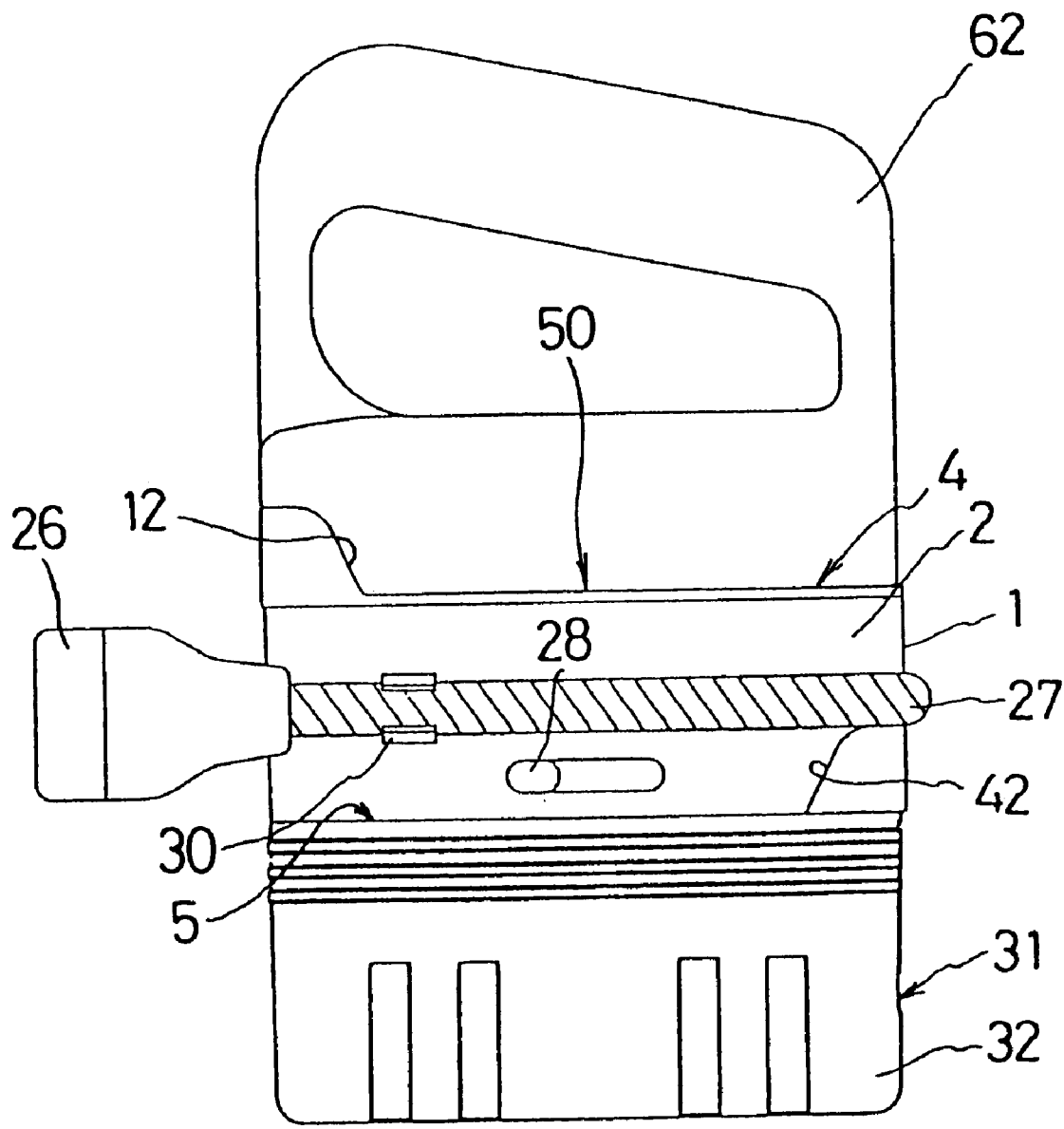
FIG. 8 shows an alternate use of the light adapter of FIG. 1 as a flashlight.

Although the light adapter 1 is attached to an electric power tool such as the driver/drill 45 in the first embodiment, other uses are also contemplated. For example, as shown in FIG. 8, if the light adapter 1 is attached to a handle assembly 62 which includes at its bottom surface a coupling structure identical to the coupling portion 50 of the driver/drill 45, the light 26 may be used separate from the tool as a flashlight by receiving power from the battery pack 31.

Embodiment 2

An alternate embodiment is described hereinafter with reference to the attached drawings, in which identical or similar reference numerals or characters denote identical or similar parts or elements throughout the several views. Therefore, description of such elements is omitted.

Figure 9:
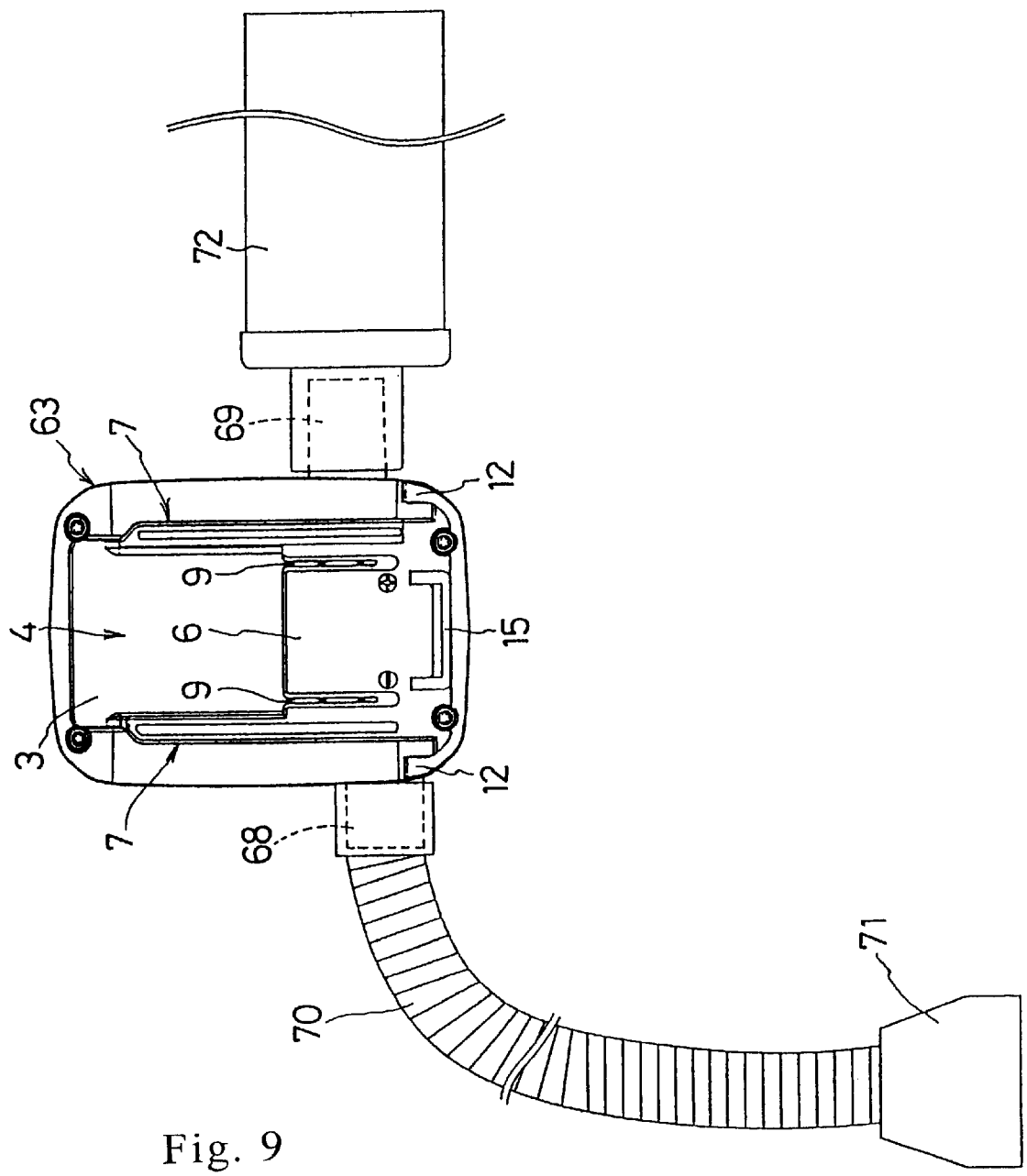
FIG. 9 is a plan view of an adapter having a cleaner function in accordance with a second embodiment.
Figure 10:
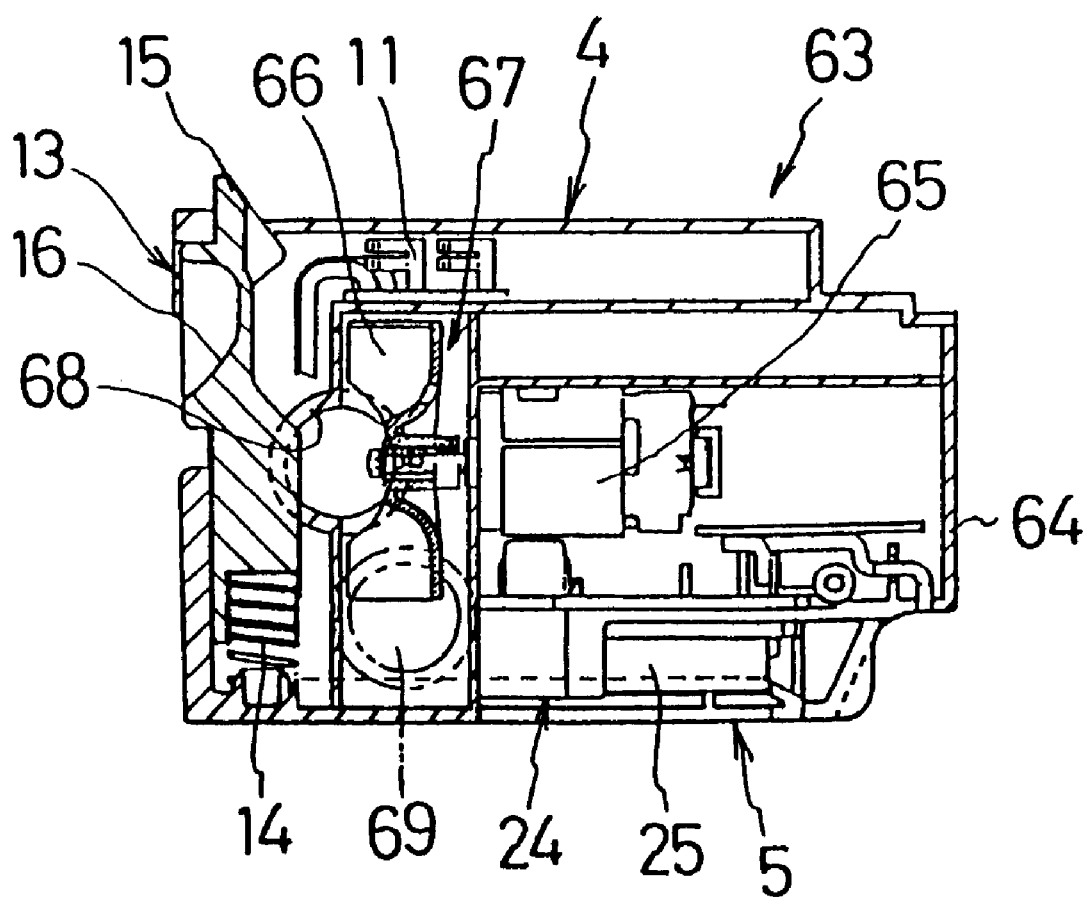
FIG. 10 is a cross-sectional view of the cleaner adapter shown in FIG. 9.
Figure 11:
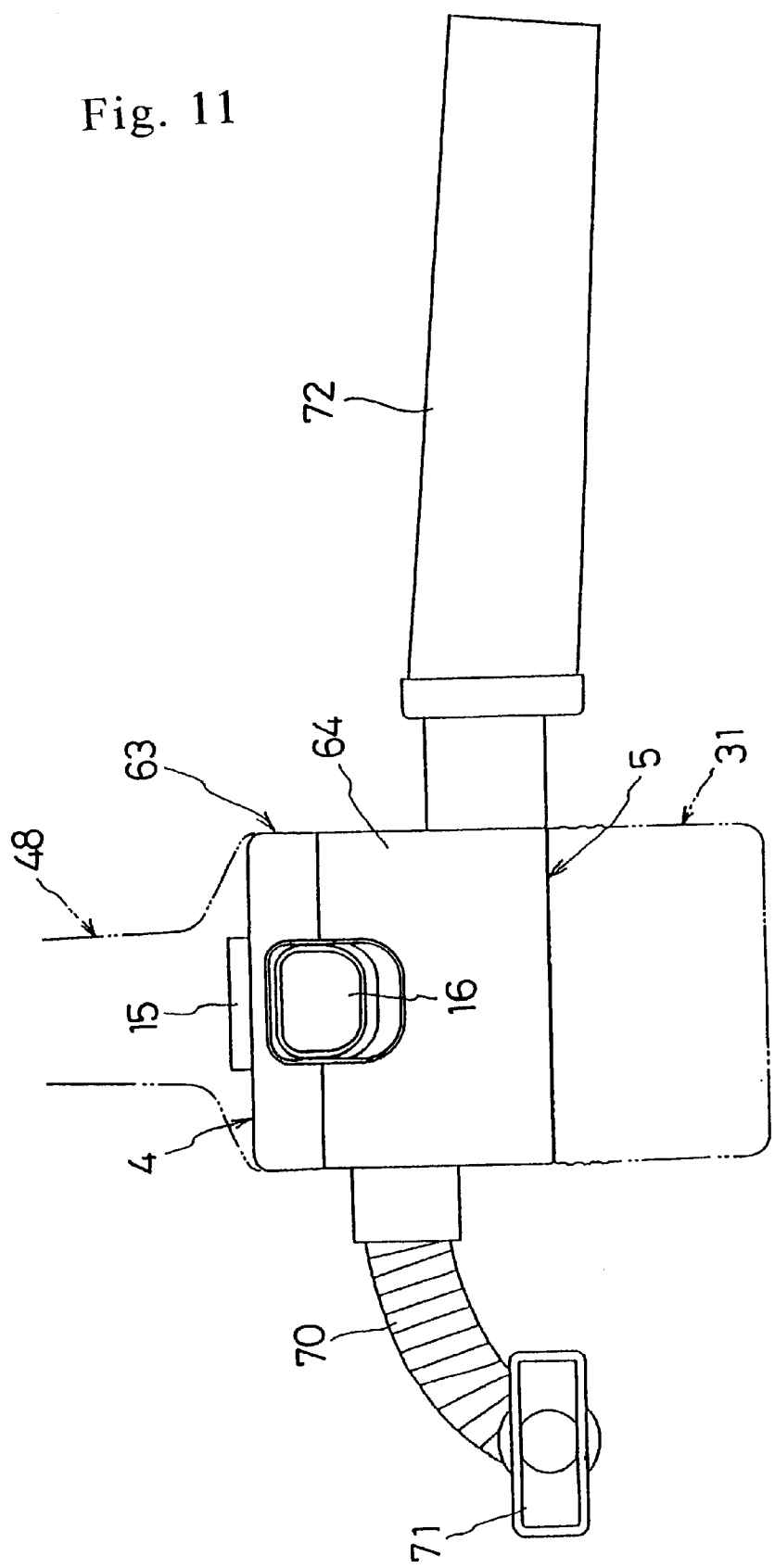
FIG. 11 shows the battery pack of FIG. 5 attached to the driver/drill of FIG. 6 via the cleaner adapter of FIG. 9.

FIG. 9 is a plan view of an adapter 63 having a cleaner function; FIG. 10 is a cross-sectional view of the cleaner adapter 63; and FIG. 11 shows the battery pack 31 attached to the driver/drill 43 via the cleaner adapter 63. The cleaner adapter 63 is provided with a first coupling portion 4 and a second coupling portion 5 at its top and bottom surfaces, respectively, as in the first embodiment. As shown in FIG. 10, however, the adapter of this embodiment includes a main housing 64, a direct-current motor (or DC motor) 65 encased within the main housing 64, a fan 66 fitted on the output shaft of the DC motor 65, and a dust chamber 67 which is partitioned off within the main housing 64 for separate accommodation of the fan 66. In addition, an intake pipe 68 and an outlet pipe 69 are disposed on the opposing side surfaces of the main housing 64, generally interposing the dust chamber 67 therebetween. The intake pipe 68 and the outlet pipe 69 place the interior of the dust chamber 67 into communication with the exterior of the main housing 64. Moreover, a suction nozzle 71 is coupled to the intake pipe 68 via a flexible stem 70, whereas a dust bag 72 is directly coupled to the outlet pipe 69.

Figure 12:
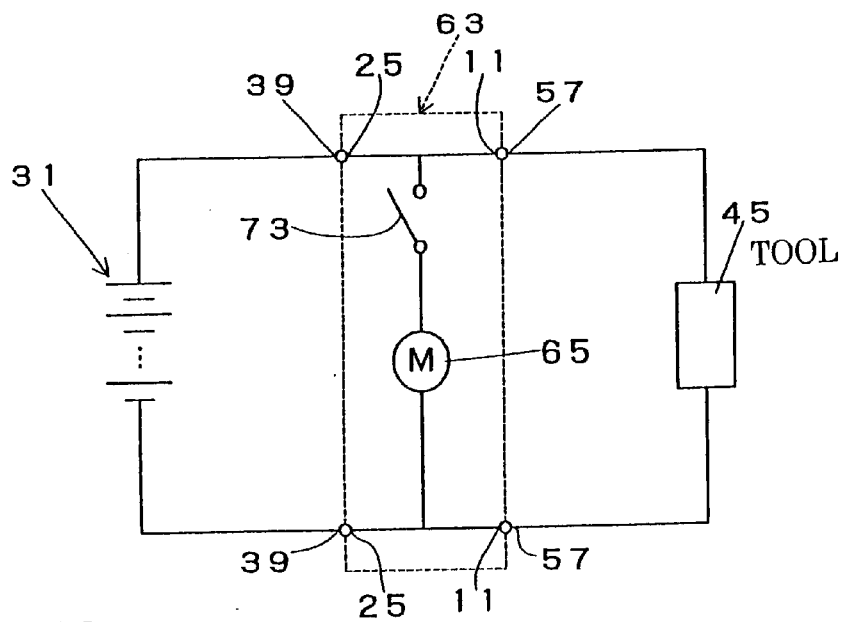
FIG. 12 is a circuit diagram of the cleaner adapter shown in FIG. 9.

Referring to the circuit diagram of FIG. 12, as in the first embodiment, the circuitry within the cleaner adapter 63 is such that when attached to the battery pack 31 and the driver/drill 45, the DC motor 65 and the change-over switch 73 are placed in parallel with the driver/drill.

In the cleaner adapter 63 thus constructed, the driver/drill and the adapter 63 are ready for use when the first coupling portion 4 is coupled to the grip handle 48 of the driver/drill 45 and the battery pack 31 to the second coupling portion 5. The power tool 45 is activated when the trigger switch 49 is pulled in. The operation of the change-over switch 73 activates the DC motor 65 to drive the fan 66, such that dust or other fine particles may be drawn in at the suction nozzle 71 through the flexible stem 70 and the intake pipe 68. The dust is then led into the dust chamber 67 and eventually collected in the dust bag 72 via the outlet pipe 69.

In the second embodiment, as the battery pack 31 is attached to the driver/drill 45 via the cleaner adapter 63 in a manner similar to the one described in connection with the first embodiment, a cleaner function can be easily added to the driver/drill 45. Another advantage of this arrangement is, as in the first embodiment, that no change in the designs of either the battery pack 31 or the driver/drill 45 is necessary, and thus no additional cost is required. Moreover, as no terminals are exposed when the cleaner adapter 63 is attached, short circuits between the terminals are prevented, and the terminals are protected from any damage. Furthermore, as the first coupling portion 4 of the cleaner adapter 63 can be set on the charger, the battery pack 31 can be charged on the charger with the adapter 63 still attached to the battery pack.

Figure 13:
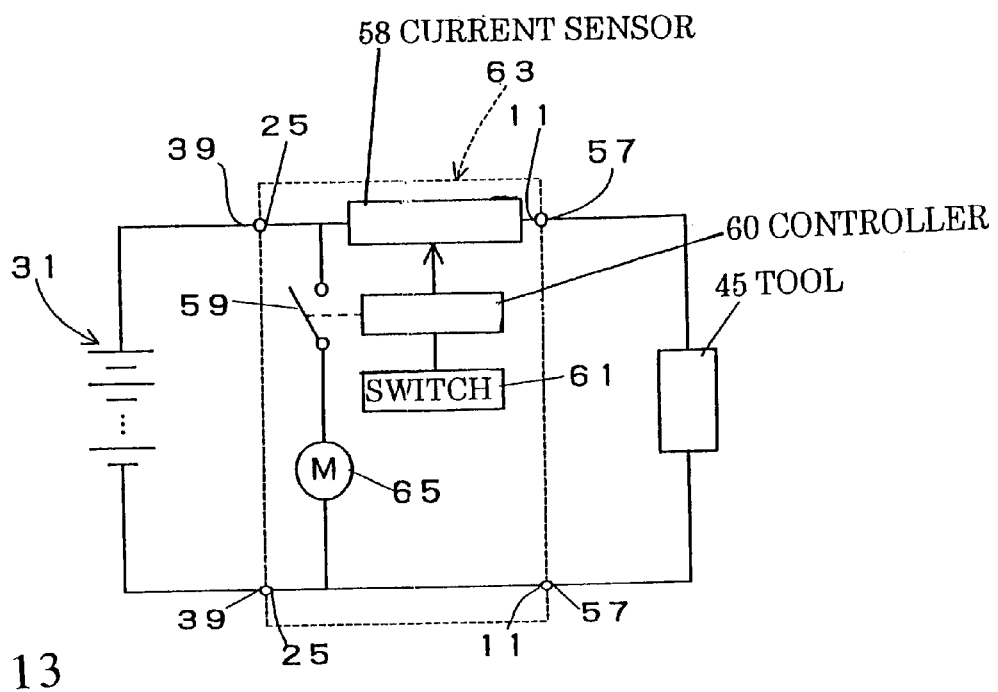
FIG. 13 is a diagram showing an alternate circuit for the cleaner adapter of FIG. 9.

It should be noted that the positions of the DC motor 65 and/or the dust chamber 67 within the main housing 64, as well as the locations of attachment of the flexible stem 70 and/or the dust bag 72 to the main housing, can be changed or modified to suit the specific application. Moreover, the circuitry within the cleaner adapter 63 may be altered as shown in FIG. 13 such that the operation of the cleaner adapter 63 and the driver/drill 45 are ganged together by addition of a current sensor 58, a contact 59, a controller 60, and a switch 61, as described in connection with the first embodiment. In addition, the dust bag 72 need not be directly connected to the cleaner adapter 63 as in this embodiment; for example, a stem may be interposed between the outlet pipe 69 and the dust bag 72, or the cleaner adapter 63 may be coupled to a different dust collector at a remote site via a tube or stem having an appropriate length.

Embodiment 3

Yet another embodiment of the present invention is described hereinafter with reference to the attached drawings, in which identical or similar reference numerals or characters denote identical or similar parts or elements throughout the several views. Therefore, description of such elements is omitted.

FIGS. 14A, 14B, and 14C are a cross-sectional view, a front elevation view, and a side elevation view, respectively, of an adapter 74 having a hook function of a third embodiment. The hook adapter 74 includes a main body 75 which is provided with a first coupling portion 4 and a second coupling portion 5 on its top and bottom surfaces, respectively. The hook adapter 74 further includes a generally L-shaped hook 76 which is secured at one end to a side surface of the main body 75 with the other free end oriented upwards. Referring to the circuit diagram of FIG. 15, the circuit of the hook adapter 74 simply couples the terminals 11 to the terminal strips 25 of the terminal block 24 as this adapter 74 does not add any electrical function to the power tool 45.

As shown in FIG. 16, when the driver/drill 45 and the battery pack 31 are attached to the first coupling portion 4 and the second coupling portion 5, respectively, the hook 76 is held upwards generally along the grip handle 48 of the driver/drill 45, allowing the user to carry the power tool 45 by reversing it and hanging the hook 76 on the user's trouser or tool belt or to hang the tool 45 on a peg or other hardware on the wall. The battery pack 31 may be removed, such that only the tool 45 and the hook adapter 74 are hung on the user's belt or the wall. When the hook 76 is not necessary, or when the hook or the adapter 74 itself is in the way of the user, thus creating a hindrance to the work at hand, the hook adapter 74 can be readily removed in a manner similar to those described above in connection with the foregoing embodiments.

In the third embodiment, as the battery pack 31 is attached to the driver/drill 45 via the hook adapter 74 in the same manner as in the foregoing embodiments, the driver/drill 45 is configured such that it is easily portable on one's person; alternatively, the tool can be hung on a structure. Another advantage of this arrangement is, as in the first and second embodiments, that no change in the designs of either the battery pack 31 or the driver/drill 45 is necessary, and thus no additional cost is required. Moreover, as no terminals are exposed when the hook adapter 74 is attached, short circuits between the terminals are prevented and the terminals are protected from any damage. Furthermore, as the first coupling portion 4 of the hook adapter 64 can be set on a charger (not shown), the battery pack 31 can be charged on the charger with the adapter 63 still attached to the battery pack 31.

The shape of the hook 76 is not limited to the foregoing; it is subject to change depending on the specific application. For example, instead of being a flat plate, the hook can be made of a bar. Moreover, the hook 76 may be secured on the rear side surface of the main body 75 or any other suitable position; furthermore the angle of attachment of the hook 76 with respect to the main body 75 may be modified without departing from the spirit and the scope of the invention.

In the foregoing embodiments, the present invention has been described by using light, cleaner, and tool-hanging hook adapters as exemplary devices attachable to a tool. It should be noted, however, that other devices, including but not limited to a radio, a case or container for tool bits, screws, nails, etc., and any other useful devices, may be incorporated into an adapter. Furthermore, two or more functions, such as those in the first to third embodiments, may be incorporated into the adapter insofar as it does not hinder work. Any type or kind of electric power tool and/or battery pack may be used in combination with the adapters of the present invention if such devices are equipped with identical or compatible coupling portions.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by letters patent is:

1. An adapter for an electric power tool on which a battery pack is mounted to supply power thereto, the adapter comprising:

a main body that includes top and bottom surfaces and that has an additional device for use with the electric power tool;

a first coupling portion provided on the top surface of the main body, the first coupling portion having a configuration identical to a coupling portion of the battery pack that is to be attached to the electric power tool; and a second coupling portion provided on the bottom surface of the main body, the second coupling portion having a configuration identical to a coupling portion of the electric power tool that is attached to the battery pack.

2. An adapter in accordance with claim 1, wherein the additional device comprises a light that operates by receiving power from the battery pack.

3. An adapter in accordance with claim 1, wherein the additional device comprises a light that can be oriented to a desired direction.

4. An adapter in accordance with claim 1, wherein the additional device comprises a light that operates by receiving power from the battery pack and that can be oriented to a desired direction.

5. An adapter in accordance with claim 4, wherein the additional device further comprises a flexible stem having a free end coupled to the light and a fixed end coupled to the main body of the adapter, thereby allowing the position of the light to be manually adjusted.

6. An adapter in accordance with claim 5, wherein the main body includes two pairs of opposing side surfaces connecting the top surface and the bottom surface, a groove formed in three of the side surfaces for at least partially accommodating the flexible stem therealong, and holder means for securing the flexible stem close to the free end of the flexible stem when the stem is accommodated in the groove.

7. An adapter in accordance with claim 6, wherein the groove has a first end at the fixed end of the flexible stem and a second end adjacent to a point at which the free end of the flexible stem is located when the stem is accommodated in the groove.

8. An adapter in accordance with claim 2 further comprising circuitry for placing the light in parallel with the electric power tool so as to permit the light to be turned on and off independently from the tool when the adapter is connected to the electric power tool and the battery pack.

9. An adapter in accordance with claim 2 further comprising circuitry that gangs together the light and the electric power tool so as to synchronize the operation of the light to that of the tool when the adapter is connected to the electric power tool and the battery pack.

10. An adapter in accordance with claim 1, wherein the additional device comprises a motor that has an output shaft and operates by receiving power from the battery pack, a fan fixed on the output shaft of the motor, a dust chamber that is defined within the main body and accommodates the fan, the dust chamber having an intake side and an exhaust side, a suction nozzle connected to the intake side of the dust chamber, and an outlet pipe connected to the exhaust side of the dust chamber.

11. An adapter in accordance with claim 10, wherein the suction nozzle and the outlet pipe are disposed on opposing sides of the dust chamber, thus interposing the dust chamber therebetween.

12. An adapter in accordance with claim 10, wherein the suction nozzle is connected to the dust chamber via a flexible stem.

13. An adapter in accordance with claim 10 further including circuitry for placing the motor in parallel with the electric power tool so as to permit the motor to be turned on and off independently from the tool when the adapter is connected to the tool and the battery pack.

14. An adapter in accordance with claim 10 further including circuitry that gangs together the motor and the electric power tool so as to synchronize the operation of the motor to that of the tool when the adapter is connected to the tool and the battery pack.

15. An adapter in accordance with claim 1, wherein the additional device comprises a hook secured to the main body for hanging the adapter.

16. An adapter in accordance with claim 3, wherein the additional device comprises a hook secured to the main body for hanging the adapter.

17. An adapter in accordance with claim 10, wherein the additional device comprises a hook secured to the main body for hanging the adapter.

18. An adapter in accordance with claim 1, wherein the first coupling portion is complementarily shaped to the second coupling portion, and further wherein the electric power tool includes a second coupling portion at its bottom surface and the battery pack includes a first coupling portion at its top surface, thus allowing attachment of the adapter to the tool and attachment of the battery pack to the adapter.

* * * * *

UNITED STATES PATENT AND TRADEMARK OFFICE
CERTIFICATE OF CORRECTION

PATENT NO. : 6,502,949 B1
DATED : January 7, 2003
INVENTOR(S) : Horiyama et al.

It is certified that error appears in the above-identified patent and that said Letters Patent is hereby corrected as shown below:

<u>Column 6,</u>
Line 57, replace "strips 67 are" with -- strips 57 are --.

Signed and Sealed this

Fifteenth Day of June, 2004

JON W. DUDAS
*Acting Director of the United States Patent and Trademark Office*